UNITED STATES PATENT OFFICE.

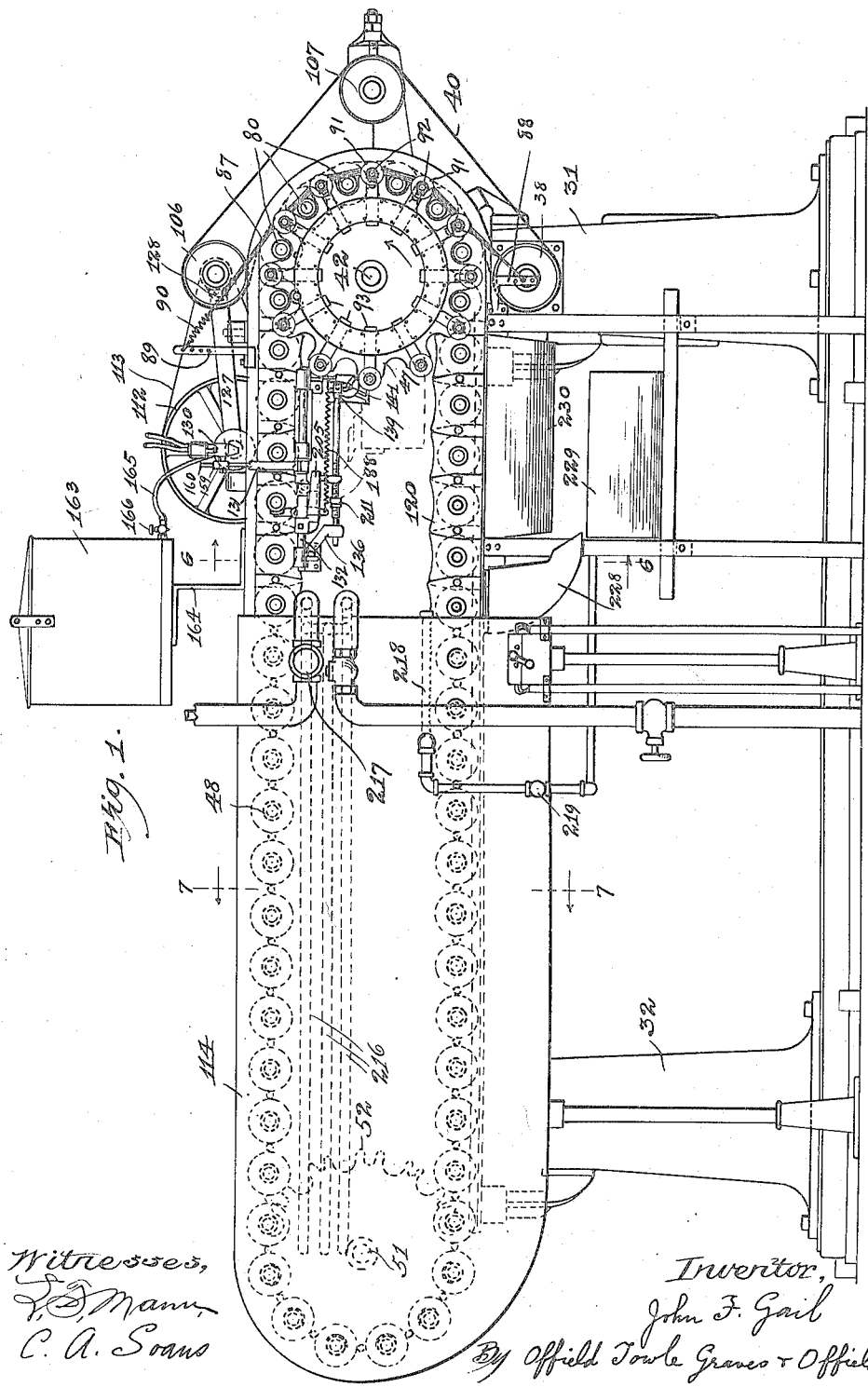

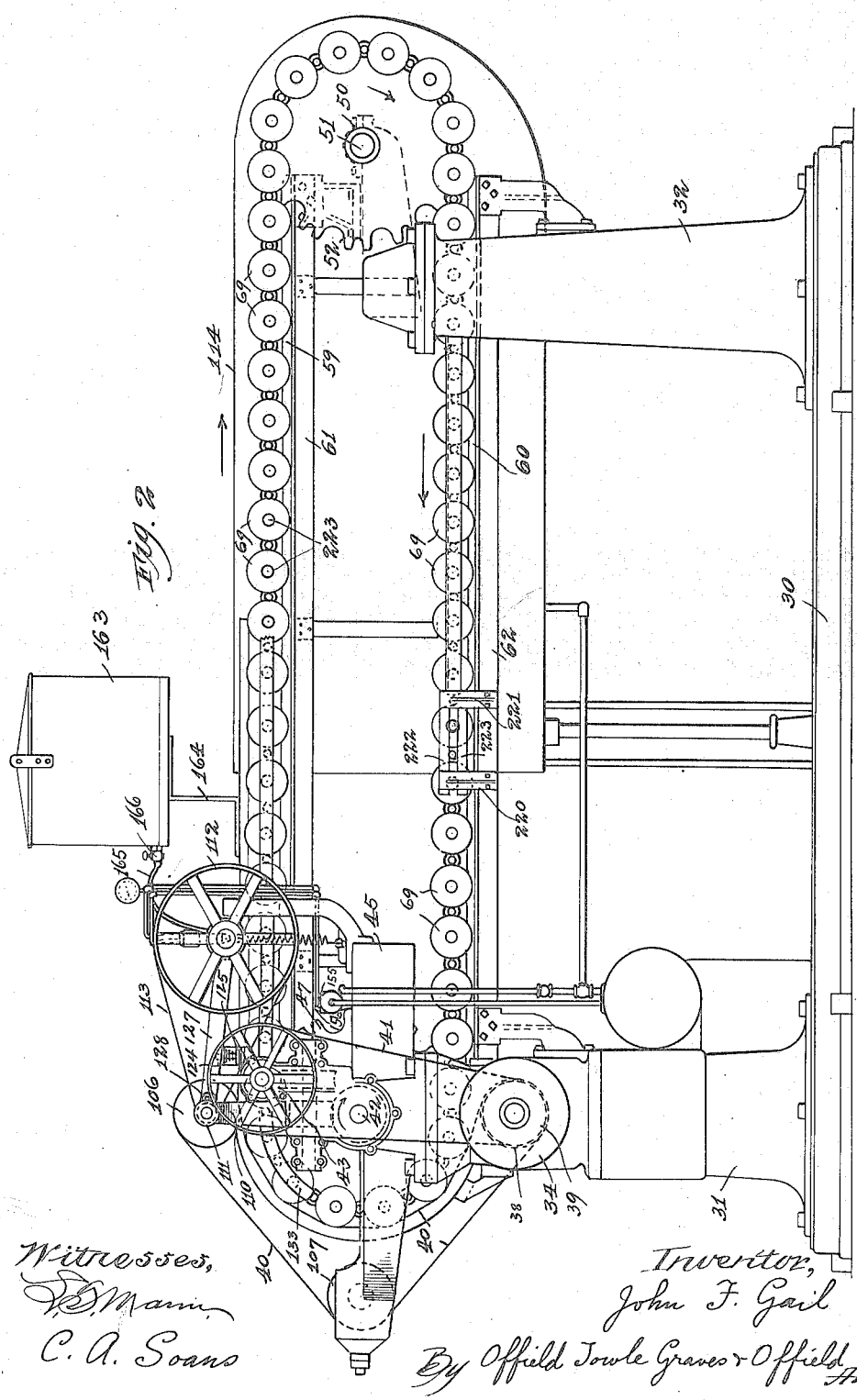

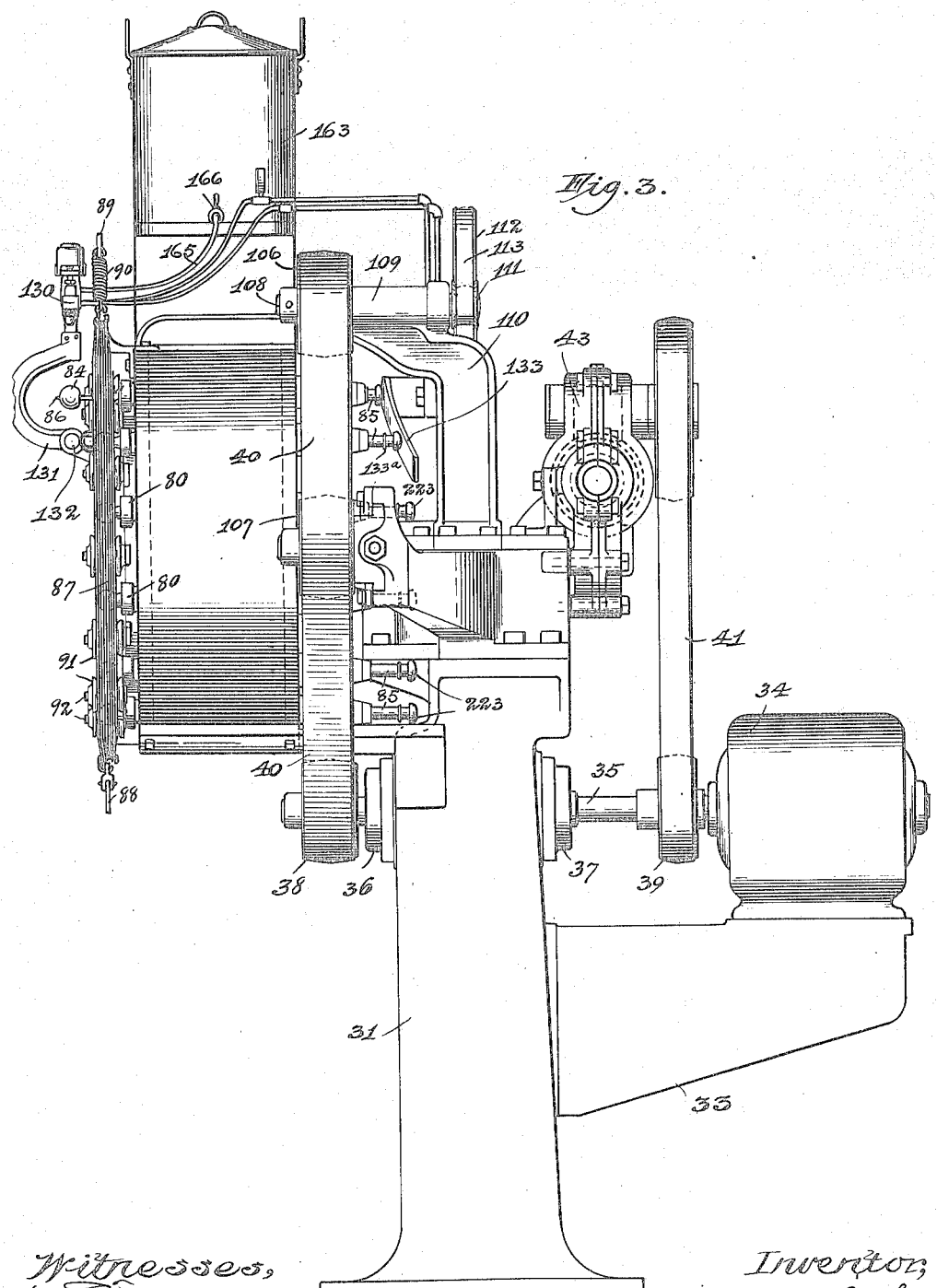

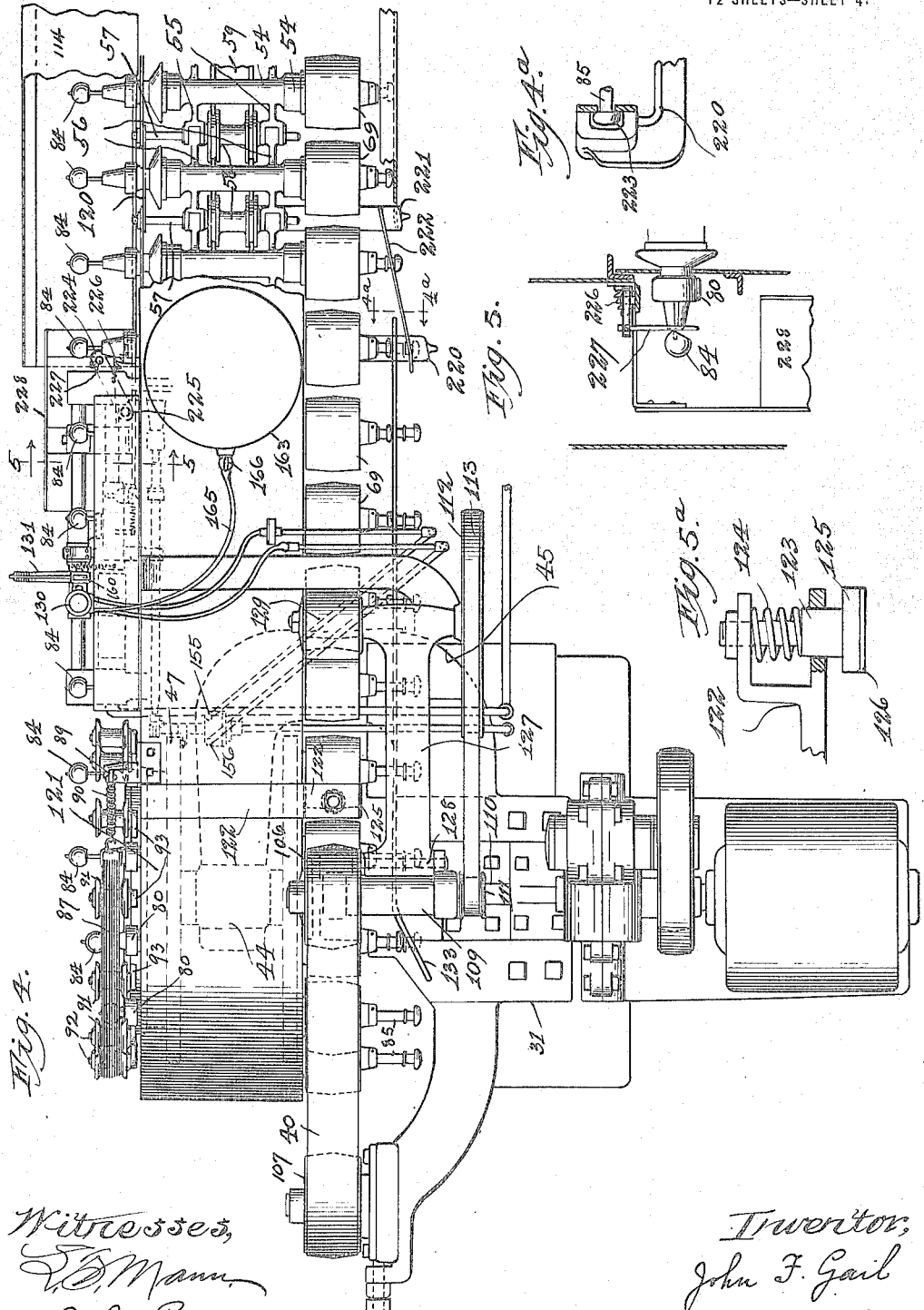

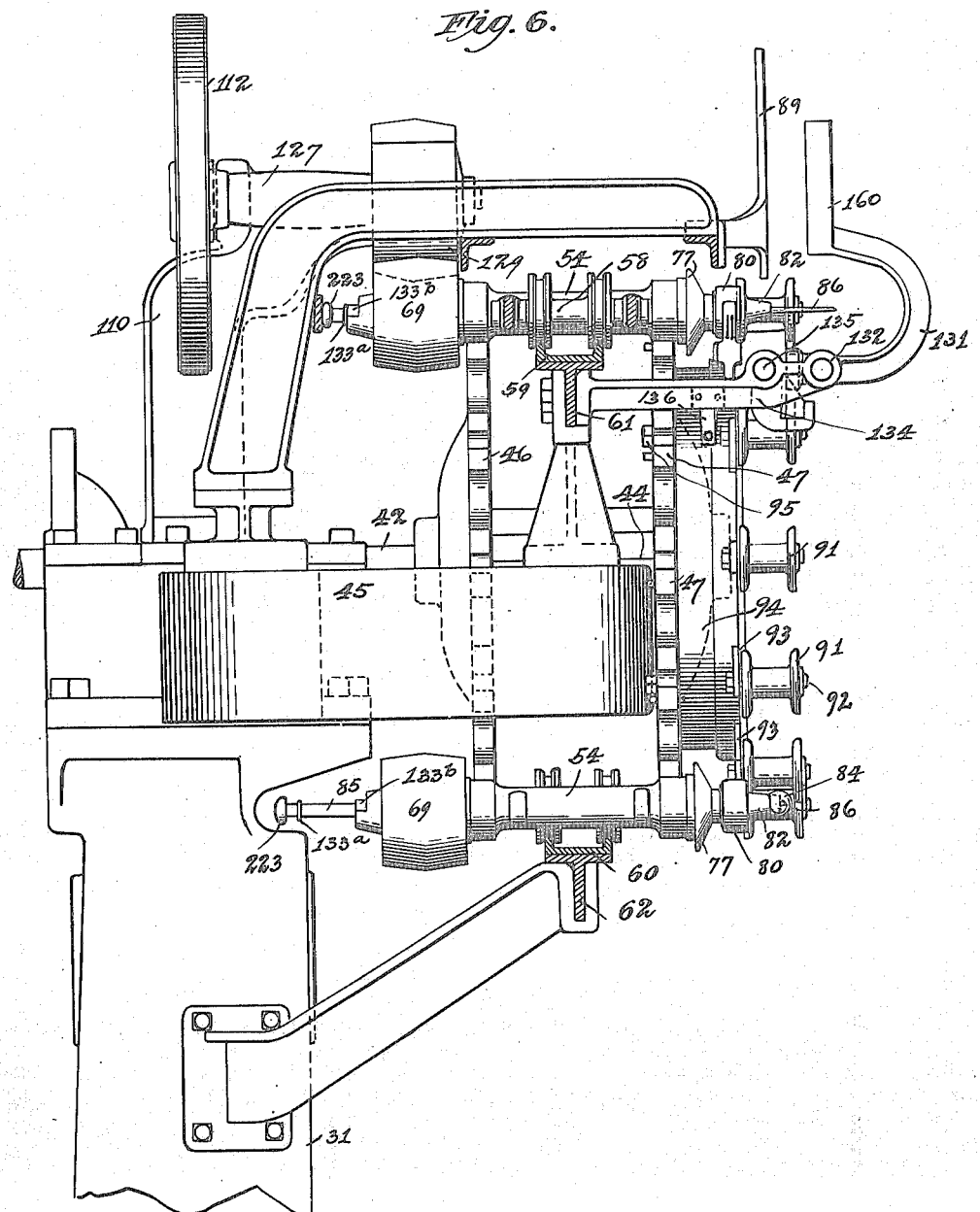

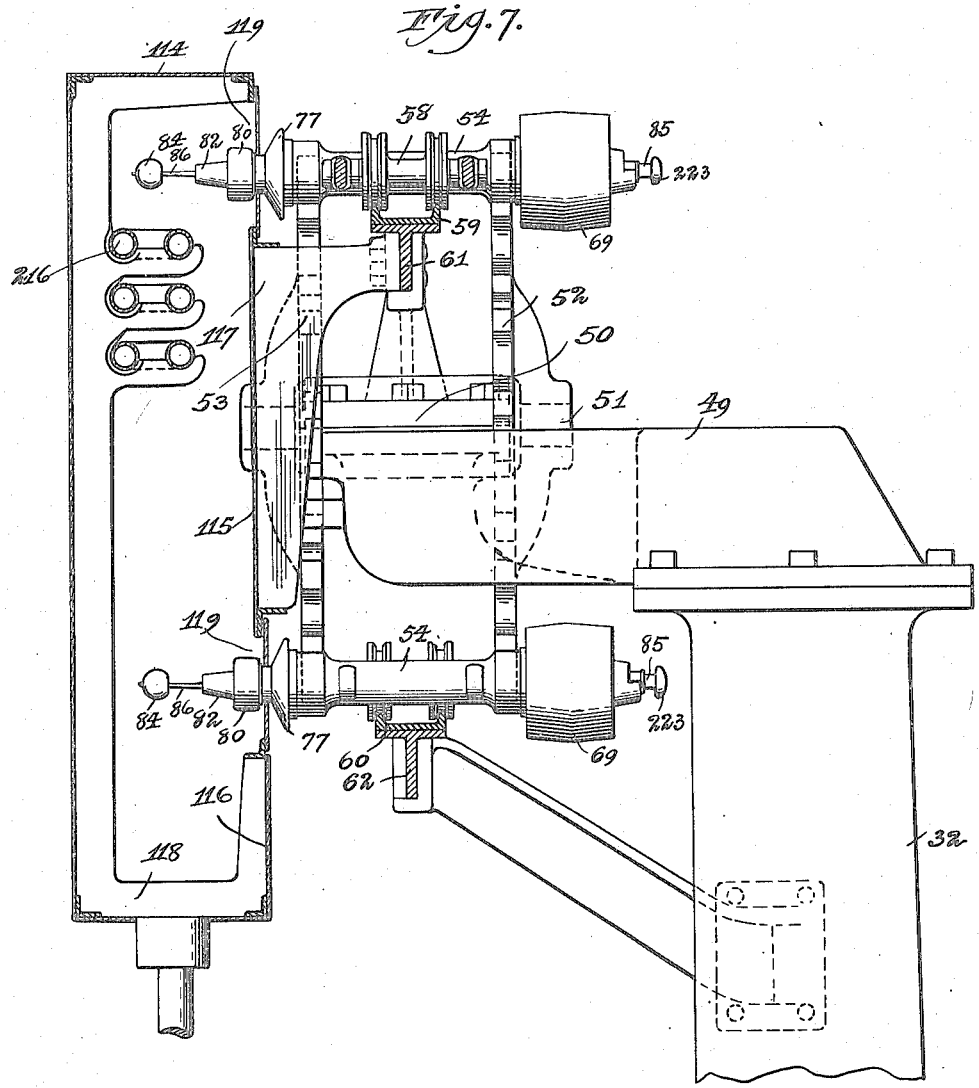

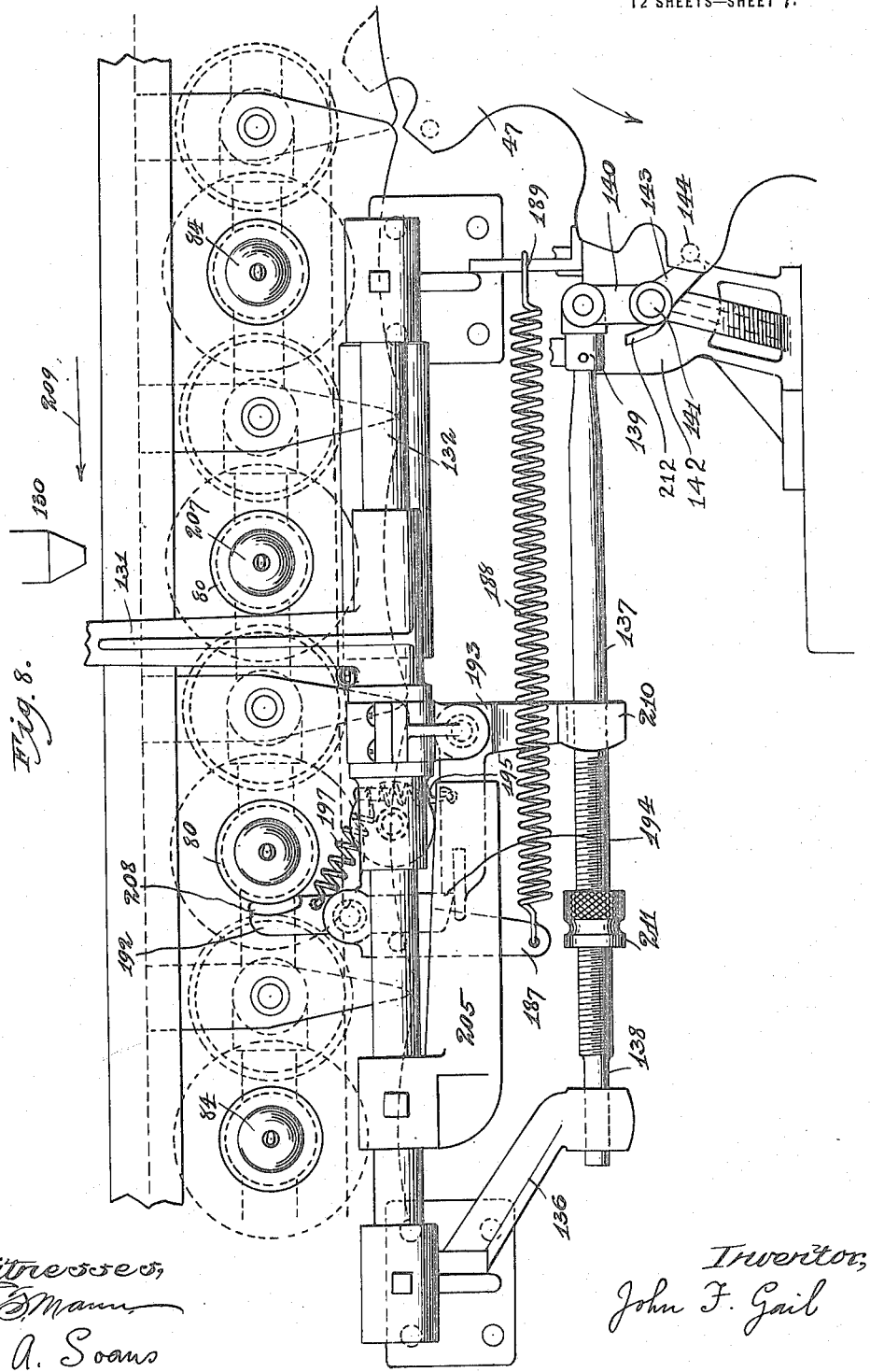

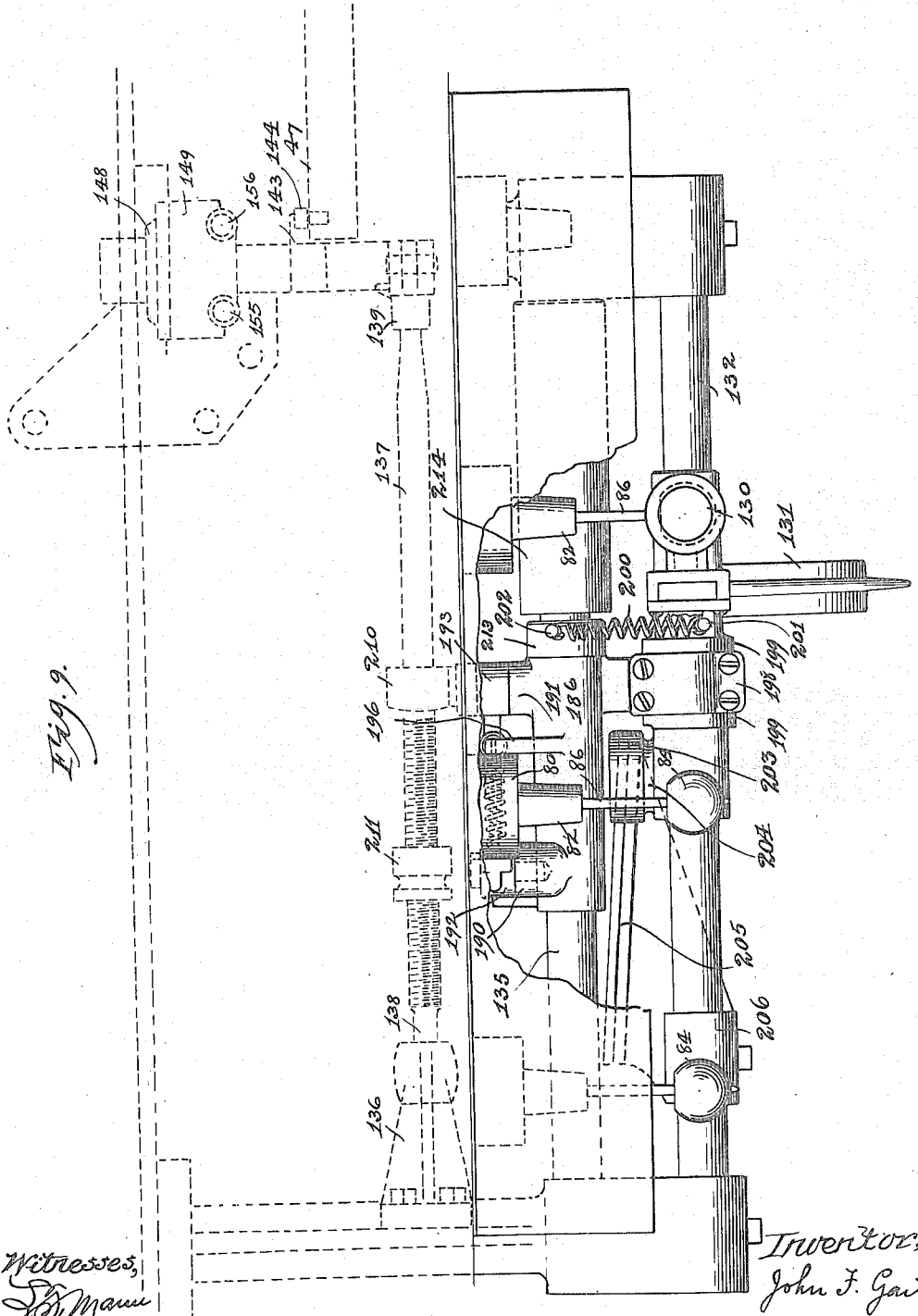

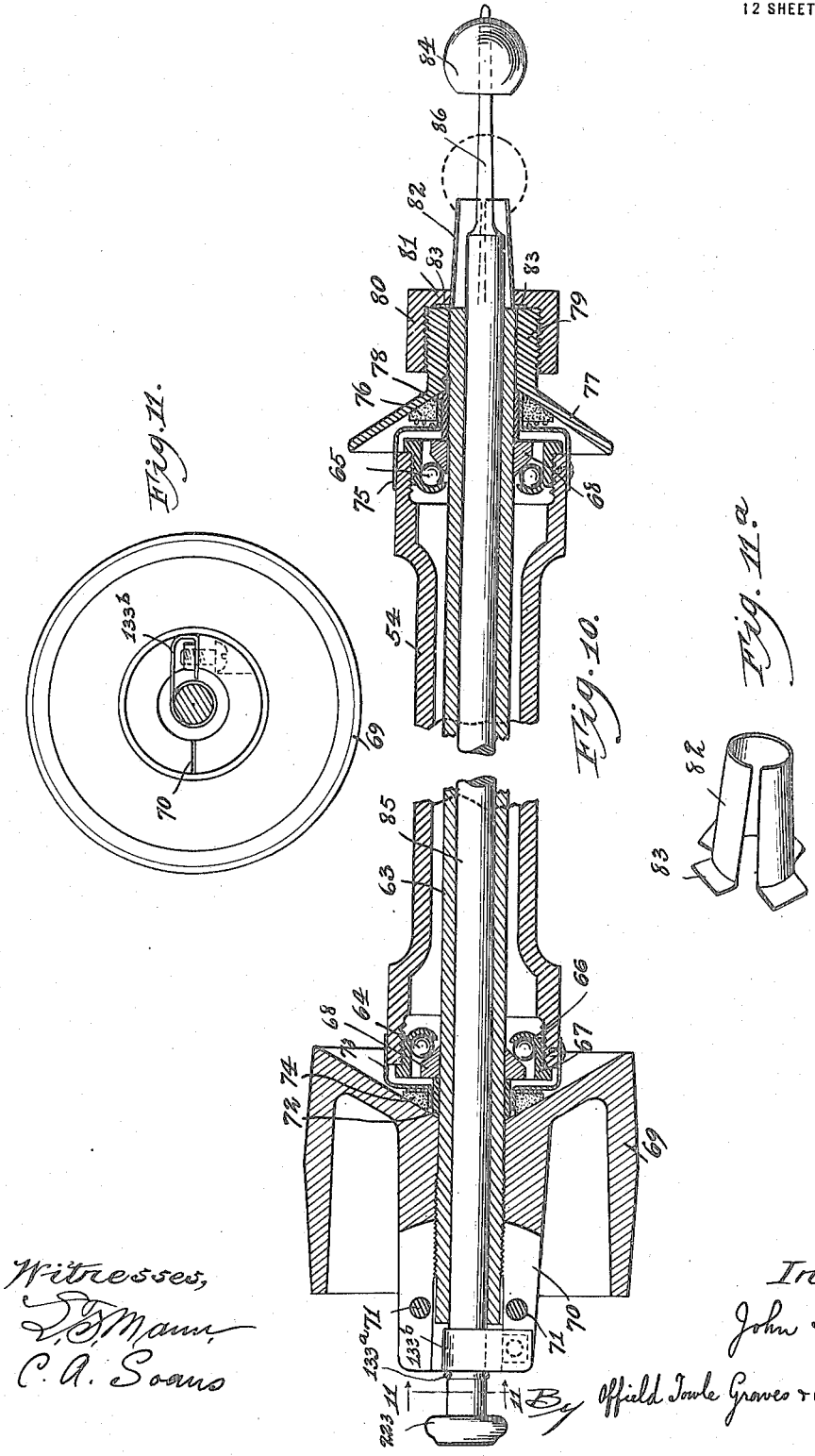

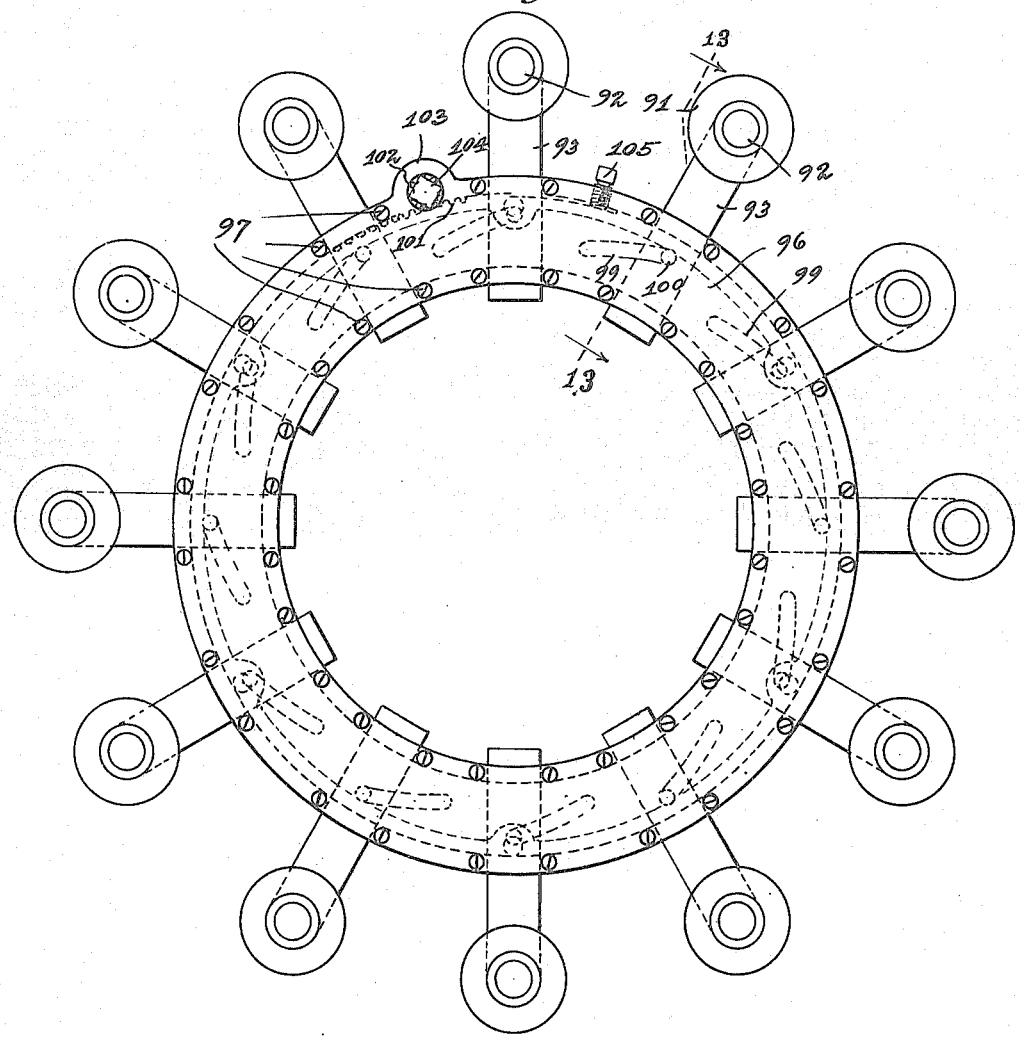

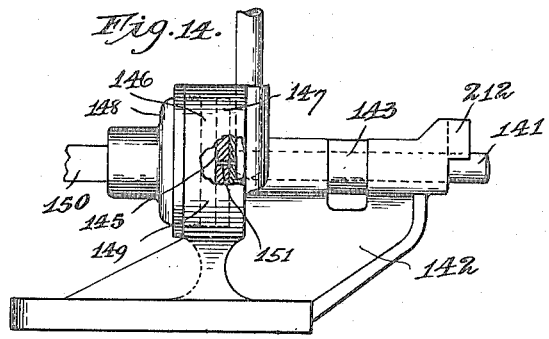
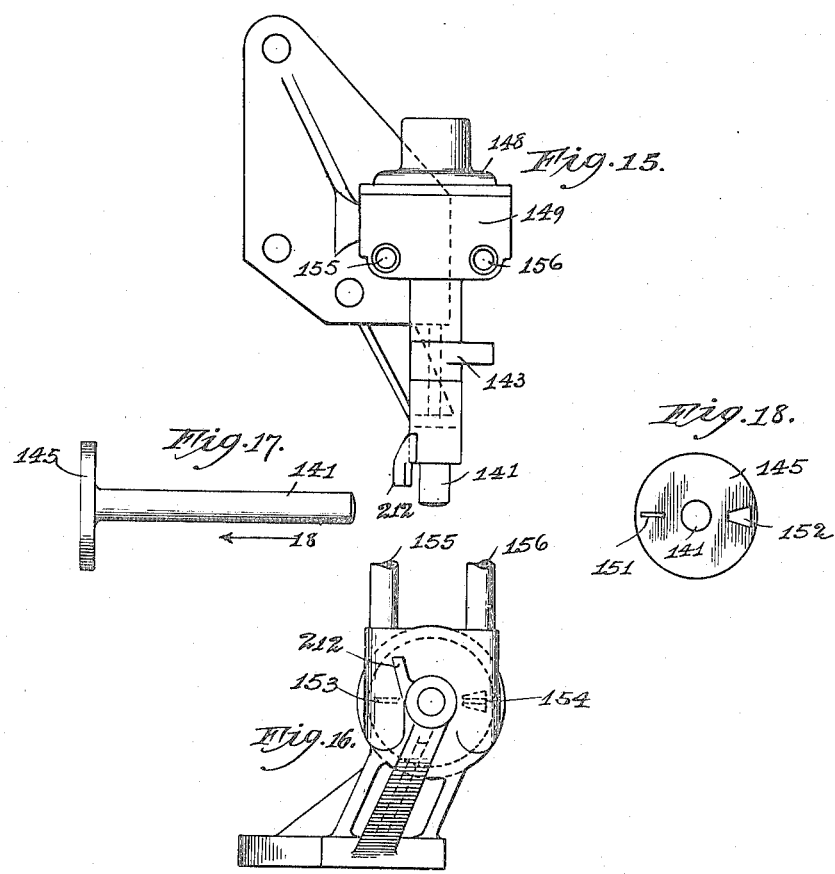

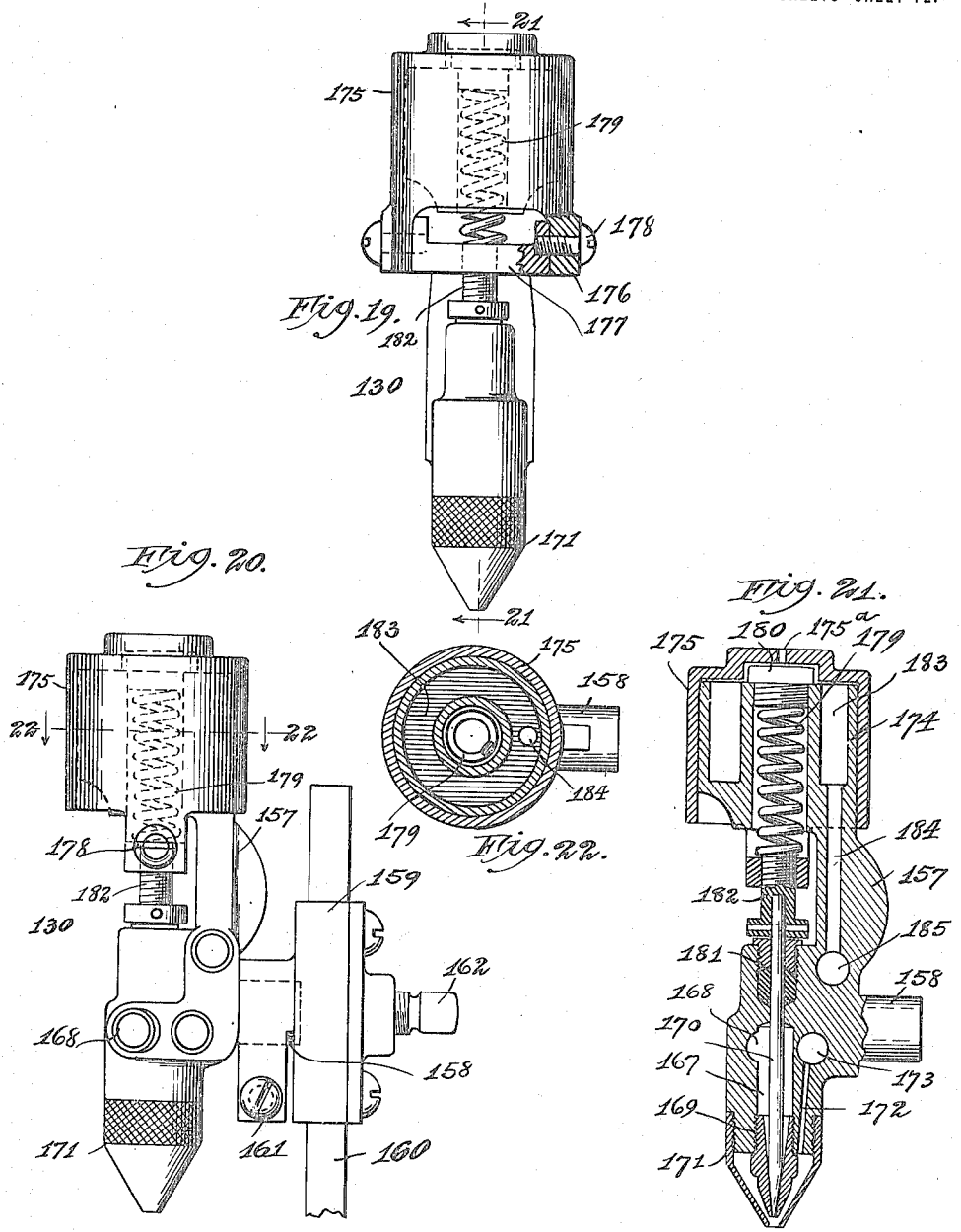

JOHN F. GAIL, OF KENOSHA, WISCONSIN, ASSIGNOR TO THE SIMMONS MANUFACTURING COMPANY, OF KENOSHA, WISCONSIN, A CORPORATION OF WISCONSIN.

AUTOMATIC POLISHING AND LACQUERING MACHINE.

1,271,027.  Specification of Letters Patent.  Patented July 2, 1918.

Application filed October 20, 1915. Serial No. 56,973.

*To all whom it may concern:*

Be it known that I, JOHN F. GAIL, a citizen of the United States, residing in the city of Kenosha, county of Kenosha, and State of Wisconsin, have invented certain new and useful Improvements in Automatic Polishing and Lacquering Machines, of which the following is a specification.

My invention relates to improvements in polishing and lacquering machines, and more particularly relates to a machine which is designed to operate upon a succession of similar articles which are automatically polished and coated without attention from the operator.

Among the salient objects of the invention are, to provide a machine in which the objects are in turn polished, receive an application of coating material, and are then artificially dried to set the coat before the objects leave the machine; to provide a machine of the class described in which the objects are successively carried into the field of the polishing devices, from thence into the field of the coating mechanism, and thence into a heated zone before finally being ejected from the machine when dry; to provide a coating machine in which the adherent coat is applied to a succession of objects, the coated objects being then carried into a heated zone and finally cooled artificially before ejection from the machine; to provide a machine of the class described in which objects are mounted in succession upon a traveling conveyer which transfers the objects in turn into the fields of the various instrumentalities; to provide a machine of the class described in which arrangements are made to prevent the coating material from gaining access to the operating parts of the mechanism; to provide a machine of the class described in which the object-holding devices are so organized that while the coat is being applied to the objects, the latter are placed in such relation to their supports that the coating material is prevented from reaching the latter; to provide a machine of the class described which is arranged to operate upon objects having an irregular contour and so organized that the polishing devices engage all portions of the surface of the object, and the coating devices apply coating material evenly to the surface of the polished object; to provide a machine which is adaptable for operating upon objects of varying sizes and contours by making minor mechanical adjustments or changes in subsidiary parts of the mechanism; to provide a machine of the class described which shall be practically automatic in its operation, the only attention from the operator consisting in the feeding of the rough objects to the machine; and, in general, to provide an improved machine of the class described.

The mechanical arrangement and manner of operation of my machine will be better understood when considered in connection with the accompanying drawings, in which—

Figure 1 is a front elevation of a machine embodying the principles of my invention;

Fig. 2 is a rear elevation of the machine in Fig. 1;

Fig. 3 is an end elevation of Fig. 1, looking from the right hand side of the figure;

Fig. 4 is a plan view of the right hand end of Fig. 1;

Fig. 4$^a$ is an end view of the shifter pin restoring mechanism;

Fig. 5 is a fragmentary section taken on the line 5—5 of Fig. 4;

Fig. 5$^a$ is an end view of the brake mechanism for arresting the rotation of the spindles;

Fig. 6 is an enlarged section taken on the line 6—6 of Fig. 1;

Fig. 7 is an enlarged section taken on the line 7—7 of Fig. 1;

Fig. 8 is an enlarged elevation of certain parts of the lacquer-applying mechanism;

Fig. 9 is a plan view of Fig. 8;

Fig. 10 is a longitudinal section of one of the spindles;

Fig. 11 is a section taken on the line 11—11 of Fig. 10;

Fig. 11$^a$ is a perspective view of one of the chuck members;

Fig. 12 is an elevation of the adjustable idler spider for the polishing belt;

Fig. 13 is a section taken on the line 13—13 of Fig. 12;

Figs. 14, 15, 16, 17 and 18 are details of parts of the operating valve for the lacquer-applying mechanism;

Fig. 19 is an elevation of the lacquering nozzle and associated parts;

Fig. 20 is a side elevation of Fig. 19;

Fig. 21 is a section taken on the line 21—21 of Fig. 19; and

Fig. 22 is a section taken on the line 22—22 of Fig. 20.

In the drawings I have illustrated as an example of the application of my invention, a machine which is designed to automatically polish and lacquer small brass mounts which are used for trimming metal bedsteads, although it should be understood that the principles of my invention may be employed in the construction of machines adapted to operate upon widely varying types and sizes of work.

This machine involves the use of a continuously traveling conveyer which carries a series of spaced apart spindles to which the objects are applied, means being provided to rotate the spindles while the objects are traveling through the field of the polishing devices. When the objects have been polished, they pass from out of the field of the polishing devices and into the field of the lacquer-applying mechanism which is automatically picked up and carried along by the conveyer for a limited distance while the lacquer is being applied, after which it is released and flies back to its normal position ready to apply the lacquer to the next succeeding object. This arrangement is preferable on account of the fact that in this instance the conveyer travels at a comparatively high linear speed and there would not be time enough to apply lacquer properly to all parts of the surface of the objects if the lacquering nozzle remained stationary as the objects traveled past. After the objects have been coated with lacquer they travel along with the conveyer into a heated zone which dries the coating, after which they enter a cool zone, and are finally automatically disengaged from the conveyer.

In this machine the frame is supported upon a base member 30 to the ends of which are bolted cast iron standards 31 and 32. Referring to Fig. 3, it will be noticed that on the rear of the standard 31 there is cast an integral bracket 33, the upper side of which forms a base for the electric motor 34 which drives the machine. The shaft 35 of this motor is extended through bearings 36 and 37 formed in the standard 31, and is furnished with a pair of driving pulleys 38 and 39 around which pass belts 40 and 41. The belt 41 drives the main shaft 42 of the conveyer mechanism through a set of double reduction worm-gearing designated as a whole 43. The outboard bearing 44 for the shaft 42 may be seen most clearly in Figs. 4 and 6 and is formed in the end of a C-shaped arm 45 (see Fig. 4) bolted upon the head of the supporting column 31. Securely keyed to this shaft 42 and spaced apart on either side of the supporting bearing 44 are a pair of dished wheels 46 and 47, the peripheries of which are suitably conformed to constitute sprocket members for the endless conveyer 48. Upon the head of the standard 32 at the other end of the machine I bolt a C-shaped laterally projecting bracket member 49, somewhat similar to the member 45; this member 49 being provided at its outer end with a bearing 50 which furnishes a support for the shaft 51 carrying a pair of dished sprocket members 52 and 53, similar to the sprocket members 46 and 47 previously described. The conveyer member 48 is thus driven from the end of the machine with which is associated the motor 34, and extends to the other end of the machine where it passes around the idler sprocket members 52 and 53, these latter revolving freely on their shaft 51 in the bearing 50.

Describing the conveyer, this is illustrated most clearly in Figs. 4 and 6. The links of the conveyer chain are represented by cast steel members 54, one side of each of which is formed with pairs of integral, spaced apart, laterally projecting arms 55, the ends of said arms being formed in U-shape to accommodate the headed ends of corresponding arms 56 formed integrally in the opposing sides of the next adjacent members 54. These members 54 are rotatably hinged together by means of laterally extending pins 57 which pass through bearing holes in the ends of the arms 55 and 56. The arms 55 and 56 are spaced apart laterally a sufficient distance to accommodate trolley wheels 58 which are adapted to rotate freely upon the hinge pins 57, these trolley wheels 58 being adapted to roll upon the tracks 59 and 60. These tracks 59 and 60 comprise channel-shaped sections which are united to T-shaped members 61 and 62 which are securely supported by bracket members bolted to the standards 31 and 32 at each end of the machine. The track wheels 58 and the tracks 59 and 60 are for the purpose of preventing sag of the conveyer, due to the relatively great weight.

Each of the link members 54 of the conveyer chain constitutes a bearing head for one of the object spindles, which latter is shown in longitudinal section in Fig. 10. Referring to the last named figure, it will be noticed that the member 54 is formed hollow, the aperture being large enough to provide plenty of clearance space for the hollow shaft 63. This latter rotates upon two pairs of ball bearings 64 and 65 applied to the ends of the member 54. These bearings 64 and 65 each consists of a set of balls 66, an outer cone 67 screwed into the hollow enlarged end of the member 54, and an inner cone 68 which fits around the shaft 63. Upon the rear end of the spindle shaft 63 there is mounted a driving pulley 69, the outer end of which is threaded upon the end of the shaft and is split, as shown at 70, so that a pair of transverse screws 71 may be tightened up to securely clamp the pulley to the shaft. Between the inner end of the pulley 69 and the outer end of the adjacent inner cone 68, I interpose a spacing sleeve 72, and in order to prevent dust from entering the ball bearing I fit over the enlarged end of the member 54 a pressed metal cap 73 which is suitably conformed to furnish a seat for the triangular-shaped felt ring 74 which bears against the inner side of the pulley 69. The other end of the member 54 is equipped with a somewhat similar dust cap 75 and felt dust ring 76 which bears against a hollow cone-shaped member 77 keyed or pinned to the end of the shaft 63. Between the cone-shaped member 77 and the adjacent inner bearing cone 68 there is inserted a spacing sleeve 78 somewhat similar to the spacing sleeve 72 at the other end of the spindle. The cone-shaped member 77, which simply constitutes a guard or shield to prevent the ingress of dirt or lacquer into the end of the bearing, is formed with a projecting nose 79 upon which is threaded a collar 80 formed with an inwardly projecting portion 81, between which and the end of the nose 79 there is clamped the hollow chuck member 82, shown more clearly in Fig. 11ª. This chuck member 82 is made from a piece of resilient sheet metal shaped into the form of a slightly tapered tube, which is split so as to furnish the desired resiliency and having formed at its inner larger end a plurality of ears 83 which are clamped between the nose 79 and the inwardly projecting portion 81 of the threaded collar 80. The diameter and degree of taper of the projecting resilient end of the chuck member 82 are such that the object 84, in this case a hollow open ended spherical bedstead mount, shown in dotted lines in Fig. 10, may be forcibly pushed onto the chuck and its resiliency will then hold the mount in position while being polished. In order to effect certain results which will hereinafter appear, the spindle shaft 63 is bored out to accommodate a longitudinal shifter pin 85, the front end of which is reduced in diameter and tapered, as shown at 86, so that it will enter and engage the small hole in the outer end of the mount 84, as shown in Fig. 10. While the shifter rod 85 is engaged with the mount 84 in this manner, the latter is thus pushed off the chuck member 82 and removed therefrom a considerable distance axially, as shown in full line positions. This occurs after the mount has been polished and when it no longer needs a particularly rigid support, and is for the purpose of preventing access of lacquer to the chuck or bearing of the spindle. It should be observed that during the time that the mount 84 is engaged with the chuck in its dotted line or polishing position, the shifter pin 85 is withdrawn inwardly, as will hereinafter appear.

Describing the polishing means and referring to Figs. 1 and 3, it will be observed that I employ a polishing band or belt 87 consisting of a large number of individual abrasive strings bunched together and resiliently maintained in the path of the traveling objects as the latter travel with the conveyer. A somewhat similar arrangement is described in my co-pending application Serial No. 846,471, filed June 22, 1914. In this case the ends of the bunch of abrasive strings are anchored to a lever bracket piece 88 and an upper adjustable bracket member 89, both secured to fixed portions of the frame of the machine. The proper degree of resiliency is obtained by means of a helical spring 90 inserted between the upper end of the abrasive belt and the bracket support 89. As shown in Fig. 3, the abrasive member is located in the proper vertical plane to engage the mounts supported upon the chucks 82 as they travel with the continuously moving conveyer. In order to maintain the bunch of strings in their proper relation so as to operate upon the mounts to the best advantage, I provide a series of confining idler pulleys 91 which are rotatably supported upon a series of pins 92 secured in a series of radially projecting supporting members 93 situated at properly spaced intervals around the spider designated as a whole 94. This spider member 94 takes the form of a narrow faced cylindrical casting which is secured to the outside of the dished sprocket wheel 47 (see Fig. 6) by a series of screws 95. Thus the idler pulleys 92 are caused to rotate with the sprockets and the conveyer, and they are so spaced around the periphery of the member 94 that they are located between the mounts at the proper radial distance to support the bunch of strings in proper operative position. In order to make the idler conveying members 91 adjustable radially to accommodate work of varying sizes and to meet different working requirements, the supporting members 93 are not directly secured to the spider 94 but are mounted radially slidable therein, as shown in Figs. 12 and 13. To this end there are milled in the front of the member 94 a series of radially extending shallow slots, deep enough to slidably accommodate the supports 93, and upon the outer face of said member 94 there is secured an annular cover plate 96 by means of a series of screws 97. In the face of the member 94 there is turned an annular groove of a sufficient depth to accommodate an adjusting ring 98 which lies behind the members 93 and is formed with a series of eccentric cam slots 99 which are engaged by pins 100 fixed in the back sides of the supporting members 93. A portion of the periphery of the annular adjusting member 98 is furnished with gear teeth 101 which are engaged by a pinion 102 rotatably mounted in a swell or boss 103 located in the outer edge of the spider member 94, this pinion being formed integral with its shaft which is squared, as shown at 104, to permit the application of a wrench for adjusting purposes. The ring 98 is locked in its proper adjusted position by means of a radially operating set screw 105. It will be obvious that if the pinion 102 be rotated, the cam slots 99 and pins 100 will coöperate to move the supporting members 93 radially inwardly or outwardly, depending upon which way the pinion 102 is rotated. Thus I provide a very convenient and simple adjustment for maintaining the abrasive member in correct relation with the work.

As in my previous application, heretofore referred to, I organize the machine in such a manner that the work may be rotated at a high velocity while it is within the field of the abrading member. For this purpose I employ an endless belt 40, previously referred to, which is trained around and engages the pulleys 69 as they travel with their spindles around the sprocket members at the motor end of the machine. This belt 40 is driven by the pulley 38, as has been previously described, and is supported in proper relation with pulley spindles 69 by means of a pulley 106 and an idler pulley 107 which is adjustable outwardly and inwardly to regulate the tension of the belt. The pulley 106 is keyed to a shaft 108 mounted in a bearing 109 located in the head of the bracket 110 supported from the top of the C-casting 45, and the other end of the said shaft 108 carries a small pulley 111 from which is driven the pulley 112 by means of a belt 113, to accomplish a purpose which will hereinafter be described. It is obvious that as the objects enter the field of the abrading member, the pulley 69 and the object spindles also enter the field of the moving belt 40, which therefore imparts rotary motion to the pulleys and their spindles, and the objects are spun at a high speed while being polished.

Referring to Fig. 7, it will be noticed that the ends of the spindles carrying the objects are inclosed and protected against currents of air by means of a galvanized iron casing 114 which extends the greater part of the length of the conveyer and surrounds the objects as they pass around the idler sprockets. The rear of this casing is formed by a pair of stationary plates 115 and 116 which are secured permanently to bracket members 117 and 118, respectively, these members 115 and 116 being suitably shaped to provide track space 119 for the spindles as they travel with the conveyer. This space 119 is closed up by a series of short plates 120 (see Figs. 1 and 4) which overlap each other and are pivoted upon the hinge pins 57 of the conveyer chain. It is understood that the plates 120 are suitably apertured to admit the spindles. Thus, during the time that the objects are traveling toward the idler end of the machine they are completely inclosed in the casing 114. The top side of the casing 114 is also continued toward the driving end so as to cover and completely surround the conveyer chain, as indicated at 121.

The lacquer-applying mechanism is located at the top of the machine and adjacent to the polishing end so that as the objects emerge from the field of the polishing belt they are ready to have the lacquer applied. However, when the spindles leave the influence of the driving belt 40, they are rotating at an extremely high velocity which must be checked before the mounts enter the field of the lacquer-applying devices, otherwise the lacquer would be thrown off by centrifugal force. It is, nevertheless, preferable to rotate the mounts slightly during the application of the lacquer so as to secure an even coating. Accordingly, when the spindles leave the influence of the driving belt, I automatically arrest their rotation by means of a brake, and later cause them to revolve at a low speed suited to the application of the lacquer. To this end I mount upon the top 121 of the casing a bracket member 122, the back end of which is forked (see Fig. 5ª) and projects above the path of travel of the spindle pulleys. The forked end of this bracket member is apertured to receive a vertically reciprocatory plunger 123 which is forced downwardly in its mounting by means of a coil spring 124. The lower end of this plunger member 123 is enlarged into the form of a foot, as shown at 125, and is shod with a leather pad 126, the length of the plunger being such that the rotating pulleys, as they pass beneath the plunger, engage the leather and thus have their rotation arrested. In order again to cause the spindles to revolve at the lower velocity necessary when applying the lacquer, I arrange a bracket arm 127 (see Figs. 2 and 4) which is pivoted at 128 to the bracket 110 adjacent the journal bearing 109. The free end of this bracket member is T-shaped to form a bearing for a transverse shaft which carries the pulley 112 at the rear of the bearing, and a small pulley 129 at the front thereof. These pulleys are both keyed upon the shaft and are driven by the belt 113 previously referred to. Thus, the pulley 129 rotates at a comparatively low speed, since the pulley 111 is very small in diameter, and the pulley 112 is a comparatively large one. The weight of the free end of the pivoted arm 127, with the parts it carries, causes the pulley 129 to drivingly engage the pulleys on the spindles as they pass beneath, and this causes them to revolve at a low speed. The pulley 129 is preferably covered with leather or similar material to increase the friction and obtain a better driving connection. The inertia of the spindles and the fact that they are mounted in relatively frictionless ball bearings, cause the spindles and the mounts they carry to continue to revolve while the lacquer is being applied and after they have passed beyond the influence of the pulley 129.

Describing the lacquer-applying mechanism, which is of the compressed air type, the lacquering head or spray nozzle designated as a whole 130 is mounted upon a C-shaped bracket 131 (see Fig. 3), which is adapted to slide upon and oscillate about the center of a shaft 132. It will be observed by referring to Fig. 3 that the position of the head is such that the nozzle points directly toward the mount which is being operated upon. It will, however, be noticed that the mount has been thrust out upon the end of the shifter pin and from off the chuck member 82, as more clearly shown in Fig. 10. This longitudinal shifting of the pin 85 is accomplished by means of a cam track member 133 which is shaped to follow the direction of travel of the spindles and is obliquely arranged to push forward the shifter pins into the position shown in Figs. 3 and 10. In order to insure that the shifter pins 85 are all pushed forward precisely the same amount, I secure an annular wire ring 133$^a$ in a groove at the proper distance from the rear end of the shifter pin so that it will engage the end of the hub of the pulley 69, and to prevent the jarring or vibration of the machine from imparting false longitudinal movements to these shifter pins, each is equipped with a small spring 133$^b$ which bears against the surface of the pin and operates as a brake. Retraction of the shifter pins in order to permit the application of the mounts to the chuck, is accomplished by a second cam track located at the back of the machine, which will be hereafter described. Referring to Fig. 6, it will be noticed that from the structural T-shaped member 61 there extends a laterally projecting cast iron bracket 134 within which are affixed the shaft 132, upon which the lacquering head is actuated, and a second fixed shaft 135. Depending from the lower side of the bracket 134 there is also riveted a small bracket 136, the lower end of which constitutes a guide or bearing for the rod 137. This latter is reduced in diameter at one of its ends 138 to enter and slide freely within the end of the said bracket 136, and the other end is secured in a knuckle piece 139 which is pivotally connected to an arm 140 keyed upon the end of the shaft 141, mounted to oscillate in the bracket 142. The bracket 142 is bifurcated to admit another arm or dog 143, which is also keyed to the shaft 141, and this latter arm 143 is arranged in such a position on the shaft as to be engaged successively by a series of inwardly projecting pins 144 fixed in the teeth of the sprocket wheel 47. Thus, as the sprocket wheel 47 revolves, the pins 144 will engage the arms 143 and oscillate the shaft 141 slightly. This shaft 141 in reality constitutes the stem of the oscillating valve head 145, which is arranged within the valve chamber 146, the latter being formed integrally with the bracket 142. This valve chamber 146 comprises a short cylindrical casting which is bored out to provide a working face 147 for the inner side of the valve head 145, which oscillates therein, the outer end of the bore being closed by means of a head or cap 148 screwed therein, between which and the valve head 145 there is a space 149 for the passage of air. Compressed air under considerable pressure is admitted to the space 149 in the valve chamber through the pipe 150. The valve head 145, shown in side elevation in Fig. 17 and in end elevation in Fig. 18, is provided with a pair of perforations 151 and 152 which constitute the valve openings and are adapted to register with a pair of openings 153 and 154 formed in the face of the valve chamber, as seen more clearly in Fig. 18. The aperture 152 is, as shown, considerably larger in area than the aperture 151 so that the former will open sooner and close later than the valve opening 151 as the valve is oscillated. These openings 153 and 154 communicate, respectively, with flexible pipes 155 and 156 leading to the lacquering head or spray nozzle 130, which is illustrated in Figs. 19 to 22, inclusive.

The principal part of the lacquering head or spray nozzle 130 is a casting 157 which is formed with an integral laterally projecting circular extension 158 adapted to fit within an aperture formed in the mounting 159, which is adapted to slide up or down the vertical bar or extension 160 projecting from the upper end of the C-shaped bracket 131. The part of the mounting 159 adjacent to the aperture for the reception of the member 158 is split and provided with a clamping screw 161 which permits the casting 157 to be adjusted and clamped in any desired position. The slide mounting 159 is also adapted to be locked in the proper position on the bar 160 by means of a set screw 162, which is threaded into the back of the mounting. The supply of lacquer is carried in a tank 163 which is elevated slightly by a supporting bracket 164 mounted upon the top of the casting 161 and flows into the spray head 157 simply by virtue of the difference in level between the surface of the liquid in the tank 163 and the lacquering head 157. The connection between the tank and the head is obtained by means of a flexible rubber tube 165, between which and the tank is interposed, for convenience, a stop cock 166. Referring to Fig. 21, it will be observed that the casting 157 is bored out from the lower end to provide a central chamber 167 which communicates with an aperture 168 connected to the pipe 165. In the lower end of this chamber or bore 167 there is screwed a valve nose 169 which is bored out to fit the needle valve stem 170. This inner valve nose is surrounded by an outer nozzle 171 which receives air under pressure through a conduit 172 from the aperture 173, which is connected to the pipe 156. When the needle valve 170 is elevated to open the needle valve nose, the lacquer flows out into the point of the outer nozzle space where it is met by the high pressure air and thus delivered in the form of a very fine spray toward the part to be lacquered. It should be noted that the shape of the two nozzles 169 and 171 is such that the air under pressure passing out of the outer nozzle opening, creates an eductive effect which sucks the lacquer positively out of the inner nozzle.

Describing the operating connections for the needle valve stem 170, it will be observed that the upper end of the casting 157 is turned off in the form of a cylinder 174 around and above which fits a cylindrical thimble head 175. Actually, the cylindrical portion 174 constitutes a piston for the movable cylinder 175 which, for a purpose which will hereinafter appear, is provided with a small vent hole 175ª so as to allow considerable leakage. The lower end of this thimble 175 is formed with a pair of diametrically opposite depending lugs 176 which are faced off on their inner opposed surfaces to admit a diametrically extending yoke piece 177, which is secured to said lugs 176 by means of screws 178. This yoke piece 177 is located some distance below the bottom of the cylindrical piston portion 174, which is bored out centrally to accommodate a compression spring 179 interposed between the top of the yoke and a threaded plug 180 closing the top of the bore. The needle valve stem 170 extends upwardly out of the chamber 167 and through a stuffing box 181, above which it is pinned into a depending stud 182 which is threaded into the yoke 177, thus providing for vertical adjustment. In the top side of the stationary piston portion 174 there is formed an annular groove or air pocket 183 which communicates, by a conduit 184, with an aperture 185 connected to the pipe 155 leading to the compressed air valve. It is manifest that when compressed air is admitted through the pipe 155, the cylinder 175 will rise and elevate the yoke 177 to which is connected the needle valve stem 170, thus allowing lacquer to flow out of the valve nose 169. As previously described, compressed air is admitted to the pipe 155 later and shut off sooner than is the case with the pipe 156, which delivers air to the outer nozzle. This insures that any lacquer which flows from out of the inner nozzle will always be subject to the full air pressure of the outer nozzle before the needle valve closes, and thus there will be no dripping of lacquer or any failure to spray it properly upon the object to be coated. The valve stem 141 is rocked in a direction to open the valves 151 and 152 by means of the pins 144, which successively strike the arm 143, and the valves remain in such open position until the rod 137 is moved by a mechanism which will now be described.

Referring to Figs. 6, 8 and 9, on the shaft 135 there is slidably mounted a slipper member 186, from the under side of which depends an integral lug 187 to permit the attachment of a coil tension spring 188, the other end of which is secured to a small fixed standard 189. On the inner side of the member 186 there is integrally formed a pair of laterally facing bosses 190 and 191 which pivotally support the vertically extending lever 192 and the downwardly projecting bell crank lever 193. The lower end of the lever 192 is adapted to engage a shoulder 194 formed on the end of the horizontal arm of the bell crank 193, which latter is normally urged upwardly by means of a coil spring 195 attached to the lug 196, which is an integral part of the member 186. To the upper end of the lever 192 there is connected a somewhat similar coil spring 197 which is also connected to the same lug 196, and thus tends to rotate the lever 192 in a clock-wise direction. Projecting from the front side of the member 186 is an arm 198 which is constructed like a split bearing to accommodate a journal-like neck formed between a pair of shoulders 199 on the lower part of the C-shaped casting 131 previously referred to, which carries the lacquering head. The lower part of this bracket 131 is extended longitudinally of the fixed shaft 132 and bored out so as to be capable of sliding freely thereon, and is normally maintained in equilibrium as against rotary motion on the said shaft 132 by means of a coil spring 200 stretched between a pin 201 secured in the top of the lower part of said bracket 131, and a pin 202 secured in the upper side of the end of the member 186. This spring 200 tends to swing the lacquering head toward the back of the machine, which tendency is resisted by a cam roller 203 mounted to revolve upon an inwardly facing boss 204 and adapted to engage a cam track 205 which, by means of an integral boss 206, is secured to the fixed shaft 132. The track member 205 is so shaped as to impart a rotary motion to the bracket 131 around the shaft 132 as an axis during the time that the head is being moved slidably along the said shaft. It should be understood that the bracket 131, carrying the lacquering head, by virtue of the shoulders 199 engaging the part 198, partakes of whatever reciprocatory motion is imparted to the part 186 in addition to its oscillatory movement just described.

The operation of the reciprocating mechanism for the lacquering head will now be described. Referring to Fig. 8, it will be noted that the pin 144 is just in the act of passing by the arm 143; the valves 151 and 152 thus being opened to their fullest extent so as to render the lacquering head operative to apply lacquer to the mount which is being operated upon, in this case the object marked 207. While the mechanism is in this instantaneous position, it will be observed that the lever 192 is maintained in an upright position, due to the fact that its curved face 208 is engaged and forced horizontally by means of the collar 80 on the spindle carrying the mount which has just previously been coated with lacquer. Inasmuch as the lever 192 is prevented from rotating against the action of the spring 197 because its lower end is interlocked with the shoulder 194 on the horizontal arm of the bell crank 193, the entire slipper member 186 moves in a horizontal direction on the shaft 135. The slipper 186 and the lacquering head which is mounted on the member 131 connected to the slipper 186 thus move synchronously with the conveyer, and lacquer is during this time being applied to the object. Also as the lacquering head moves with the conveyer, the cam track 205 engages the roller 203 and oscillates the bracket 131 carrying the lacquering head, which thus describes an arc of a circle around the object and distributes the lacquer evenly over its entire surface. Shortly before the lacquering head reaches the limit of its stroke, its stroke being slightly less than the spacing of the spindles of the conveyer, the lower end 210 of the bell crank, which is forked so as to fit over the rod 137 with substantial clearance, strikes the adjustable collar 211 which is threaded upon the rod 137. When this occurs, the bell crank does not oscillate on its pivot, since the spring 195 is comparatively strong, but instead of doing so it remains in the same relative position on its mounting 186 and thus moves the rod 137 longitudinally. As previously described, the rod 137 is pivotally connected to the upper end of the arm 140 which is fast upon the end of the valve stem 141, and thus the latter is oscillated in a direction to close the openings 151 and 152. When the opening 151 closes, the supply of compressed air is cut off from the pipe 155, leading by way of the aperture 185 and conduit 184, to the space 183 within the piston member 174. When this occurs, the air under pressure which has previously been entrained in these spaces rapidly leaks out, due to the vent hole in the top of the cylinder 175, and the spring 179 then forces the yoke 177 downwardly and closes the lacquer needle valve 170. The valve aperture 152, owing to its greater area, remains open for an instant after the closing of the valve aperture 151 has shut off the lacquer feed by closing the needle valve 170, and thus what little lacquer has dripped out of the needle valve shortly before it closed, is effectively expelled from the nozzle. When the valve opening 152 finally does close, the compressed air supply is entirely cut off from both of the apertures 173 and 185, and the lacquer head remains inoperative to spray lacquer until the compressed air valve is again opened. Shortly after the valve aperture 152 has become entirely closed by the movement of the valve stem 141 under the influence of the rod 137, the side of the arm 140 strikes against a lug 212 which is cast integrally with the bracket casting 142; thus, the movement of the control rod 137 is positively arrested and the bifurcated end 210 of the depending arm of the bell crank 193 is prevented from moving any farther in a longitudinal direction. Since, however, the member 186 is still engaged with the conveyer and consequently traveling bodily with it, the pivot of the bell crank moves with reference to its bifurcated end 210, the power of the conveyer overcoming the resistance of the spring 195, with result that the bell crank swings in a counter-clock-wise direction and the shoulder 194, on its horizontal end, is disengaged from the lower end of the swinging lever 192. When this occurs, the slipper member 186 flies back under the influence of the relatively strong spring 188, carrying with it the lacquer head, during which movement the vertical lever 192 wipes past the part 80 of the object spindle, the spring 197 being relatively weak as compared with the spring 188. As soon, however, as the lever 192 has wiped past the member 80, it again assumes a vertical position, with its lower end in engagement with the shoulder 194 on the bell crank and is found to be in a position ready to be engaged by the part 80 on the next succeeding spindle as soon as the slipper member 186 has been arrested by its end 213 striking the adjustable stop member 214. Thereupon, a fraction of a second after the sliding parts have come to rest in their extreme right hand position, the next spindle engages the finger 208 and the complete cycle of operations is repeated. It should be understood that when the bifurcated end 210 strikes the part 211 and shifts the rod 137 to close the compressed air valve, the finger 143 is at that instant located in the space between a pair of the pins 144 carried by the sprocket wheel 47, and thus there is no interference with its reverse motion. It should also be observed that directly after the lacquering head has resumed its forward movement, due to one of the parts 80 striking the finger 208, one of the pins 144 strikes the arm 143, opening the compressed air valve, which thus causes the lacquering head to expel liquid from the nozzle. During the time that lacquer is being sprayed upon the objects, the latter have been thrust out of the spindles upon the ends 86 of the shifter pins 85 so as to prevent access of lacquer to the ends of the spindles, which latter are also protected behind the parts 80 by means of the articulated guard plates 120 previously described.

When the objects have been properly coated with lacquer by means of the mechanism just described, the conveyer in its further movement carries them into the upper portion of the casing 114 within which are located a series of pipes 216 supplied with live steam from a valve 217. These pipes extend parallel with the direction of travel of the objects and are located a short distance below them. It is manifest that the effect of causing the objects to travel for a considerable distance immediately above these heated pipes is to dry the lacquer quickly. When the objects pass out of the end of the steam heated zone above the series of pipes 216, they are carried by the idler sprockets into the lower portion of the casing 114, which is relatively cool, and then travel in a reverse direction toward the polishing end of the machine. After they have traveled to approximately the middle of the machine they pass beneath a horizontal pipe 218 which is perforated along its lower side and is supplied with cold compressed air through the valve 219. The jets of cold air from the pipe 218, which strike the objects in their travel, completely cool the objects and reduce their temperature to a degree which admits of their being removed from the conveyer without danger of injury to their finished lacquered surfaces.

The objects are automatically removed from the spindles of the conveyer by mechanism shown in Figs. 2, 4 and 4ᵃ. It should be understood that during the time that the objects are being lacquered, heated, and cooled, the shifter pins have been pushed forward in the hollow spindles to their fullest extent. In order to return these shifter pins to their inoperative position while at the same time assisting in the disengagement of the objects from the spindles, I secure to the fixed longitudinal member 62 a pair of small brackets 220 and 221 which support a pair of obliquely arranged strap metal members 222, these being spaced apart vertically a sufficient distance to admit the necks at the ends of the shifter pins, but close enough to each other to prevent the heads 223 from passing between. The cam track members 222 are suitably positioned so that the heads 223, on the back ends of the spindles, in their movement with the conveyer pass behind and engage the oblique surface of the strap metal members 222 which thus operate to withdraw the shifter pins into their inactive position so that their ends 86 are withdrawn within the chuck members 82. When this occurs, obviously, the mounts 84 are pulled back on the shifter pins until they strike the ends of the chucks 82, and this alone is usually sufficient to disengage them from the spindles. In some cases, however, due to a deposit of lacquer or other causes, the mounts remain in engagement with the chuck members 82 or pins 86 and do not drop off. Accordingly, to insure the removal of such I employ the mechanism shown in Figs. 4 and 5. This comprises a horizontally swinging arm 224 which is mounted upon a vertical fixed pivot 225 and urged against the direction of travel of the conveyer by means of a rather light coil spring 226. The outer end of this swinging arm 224 carries a depending finger or rod 227 which is arranged to engage the end of the spindle just behind the mount 84 and wipe the latter from off the end of the chuck as the conveyer carries it along. When the end of the spindle has wiped past the depending finger 227, the latter swings back into its normal position, as shown in Fig. 4. The finished mounts, when detached from the conveyer, fall into a padded spout 228 (see Fig. 1) which delivers them into a box 229.

The supply of rough unfinished mounts is conveniently placed in a trough 230 supported just below the ends of the spindles in such position that the operator can conveniently, by hand, apply them to the chucks.

It is manifest that many of the details of the machine may be modified considerably without departing from the spirit of the invention, and hence I do not wish to be limited, except as specified in the appended claims.

I claim—

1. In a machine of the class described, the combination of an endless continuously traveling conveyer provided with a series of object-supports, means for rotating said objects on said supports, polishing means adapted to operate upon said objects during a portion of their travel on said conveyer, coating means adapted to apply liquid finish to the surfaces of said objects after they leave the polishing field, and means for effecting relative movement between said objects and said conveyer prior to the entrance of said objects into the coating field to prevent access of coating compound to said conveyer parts.

2. In a machine of the class described, the combination of an endless, continuously traveling conveyer, provided with a series of object supports, a coating head adapted to direct a jet of coating material toward the objects during a portion of their travel on said conveyer, means for causing said coating head to operate upon successive objects carried by said conveyer, and means for reciprocating said head, a portion of said reciprocatory movement being synchronized with the movement of the successive objects operated upon.

3. In a machine of the class described, the combination of an endless continuously traveling conveyer provided with a series of object-supports, bodily movable coating means adapted to direct a supply of liquid finish toward the surface of said objects while on said conveyer, and intermittently operating engaging means synchronized with the movement of the conveyer for successively effecting operative relation between said coating means and each of said objects on said conveyer.

4. In a machine of the class described, the combination of an endless continuously traveling conveyer provided with a series of object-supports, coating means adapted to apply an adherent liquid coating to said objects while on said conveyer, and means for effecting a reciprocatory movement of said coating means positively actuated by, and synchronized with, said conveyer during a portion of its travel.

5. In a machine of the class described, the combination of a continuously traveling endless conveyer provided with a series of object-supports, polishing means for operating upon a series of objects on said supports, movable liquid coating means adapted to direct a jet of liquid toward the surface of said objects during their travel with said conveyer, means for synchronizing the movement of said coating means during a portion of its travel, and means for changing the direction of said jet during said synchronized movement.

6. In a machine of the class described, the combination of a continuously traveling carrier provided with a series of object-supports, means for applying a coating of quick-drying finish to said objects while the latter are mounted on said carrier, synchronized means adapted to effect a movement of said coating means with said carrier during a portion of the travel of the latter, and means for retracting said coating means.

7. In a machine of the class described, the combination of a continuously traveling carrier provided with a series of object-supports, means for applying a coating of adherent finish to said objects while the latter are mounted on said carrier, synchronized means adapted to effect a movement of said coating means with said carrier during a portion of the travel of the latter, means for retracting said coating means, and means for effecting relative movement between said coating means and said object during said synchronized movement, whereby the entire area of said object is finished.

8. In a machine of the class described, the combination of an endless, continuously traveling, chain conveyer composed of a series of articulated bearing members, object supports comprising spindles mounted transversely of the chain and adapted to rotate in said bearing members, pulleys on said spindles, means for supporting said chain during a portion of its movement, a belt adapted to engage the pulleys on said spindles in the supported zone of said chain to rotate said spindles, a polishing member for engaging the objects during such rotation, and means for coating said objects during a subsequent portion of the movement of said conveyer.

9. In a machine of the class described, the combination of a continuously traveling carrier provided with a series of object-supports projecting therefrom, polishing means for surfacing the objects while supported on said carrier, means for coating said objects after they are polished, and means for projecting said objects outwardly from said carrier before they are coated.

10. In a machine of the class described, the combination of a carrier provided with a series of supporting spindles, chucks on said spindles, polishing means adapted to surface the objects carried by said chucks, coating means adapted to operate upon said objects after they have been polished and while still on said carrier, and means for effecting an endwise movement of said objects away from said carrier prior to the coating operation.

11. In a machine of the class described, the combination of an endless continuously traveling conveyer provided with a series of object-supporting spindles, chucks on said spindles, means for rotating said spindles, polishing means adapted to operate upon said objects during a portion of their travel with said conveyer, means for coating said objects with finishing material after they have been polished, and means for effecting a successively endwise axial movement of said objects away from said conveyer prior to said coating operation.

12. In a machine of the class described, the combination of a continuously traveling endless chain conveyer, a series of spindles mounted on said conveyer with their axes at a substantial angle to the line of travel of said conveyer, means for rotating said spindles, polishing means arranged in the path of travel of said objects in their initial position on said conveyer, coating means, and means for effecting an outward transverse movement of said objects prior to the entrance of the objects into operative relation with said coating means.

13. In a machine of the class described, the combination of an articulated endless continuously traveling conveyer, a series of spindles mounted on said conveyer with their axes at substantially right angles to the line of travel of said conveyer, chucks on said spindles for supporting a series of objects to be polished and coated while on said conveyer, means for rotating said spindles, polishing means arranged in the path of travel of said objects while in their initial position on said conveyer and during a portion of their travel, means for coating said objects after they are polished, the field of said coating means being arranged subsequent to and laterally displaced from the field of said polishing means, and means for effecting an axial movement of said objects away from said conveyer prior to the coating operation.

14. In a machine of the class described, the combination of an endless carrier provided with a series of object-supports projecting therefrom, automatic means for coating said objects while mounted on said carrier, and a guard-plate interposed between the coating means and said carrier and mounted on said carrier.

15. In a machine of the class described, the combination of an articulated carrier provided with a series of object-supports projecting therefrom, automatic means for coating said objects while mounted on said carrier, and a series of articulated guard-plates mounted on said carrier for preventing access of coating material to said carrier.

16. In a machine of the class described, the combination of a continuously traveling endless chain conveyer provided with a series of object-supporting spindles projecting therefrom, means for coating said objects during a portion of their travel on said conveyer, and a series of overlapping articulated guard-plates mounted on said conveyer for preventing access of coating material to said conveyer.

17. In a machine of the class described, the combination of a continuously traveling endless chain conveyer, a series of spindles mounted to rotate on said conveyer with their axes substantially at right angles to the path of travel of said conveyer, means for rotating said spindles, coating means adapted to apply finish to said objects during a portion of their travel with said conveyer, and a series of overlapping articulated guard-plates surrounding said spindles and adapted to prevent access of coating material to said conveyer during said coating operation.

18. In a machine of the class described, the combination of a continuously traveling endless chain conveyer, a series of spindles adapted to rotate on said conveyer upon axes at right angles to the line of travel of said conveyer, chucks carried by said spindles and projecting from said conveyer, coating means adapted to direct a jet of coating material toward said objects during a portion of their travel on said conveyer, and overlapping guard-plates mounted between said chucks and said conveyer and articulated together.

19. In a machine of the class described, the combination of an endless continuously traveling conveyer provided with a series of object-supporting spindles transversely mounted on said conveyer, chucks on said spindles projecting from said conveyer, means for coating said objects while on said conveyer with a quick-drying compound, a casing arranged to inclose said objects during their travel with said conveyer after being coated and provided with a longitudinal opening to admit said spindles, and a series of overlapping articulated guard-plates surrounding the ends of said spindles between the chucks and the conveyer and adapted to close said longitudinal opening.

20. In a machine of the class described, the combination of an endless continuously traveling conveyer composed of a series of articulated bearing members, spindles mounted in said bearings with their axes at right angles to the travel of said conveyer, chucks on the ends of said spindles projecting from said conveyer a substantial distance, means for rotating said spindles, means for coating the objects carried by said chucks while moving with said conveyer, means for drying said objects after they have been coated, a casing adapted to inclose said objects during a substantial length of their travel after having been coated, and provided with a longitudinal opening for admitting the ends of said traveling spindles carrying the chucks, and a series of overlapping guard-plates adapted to surround said spindles, located between the chucks and the conveyer and adapted to close said longitudinal opening.

21. In a machine of the class described, the combination of a continuously moving carrier provided with a series of object-supports, a mounting adapted to reciprocate substantially parallel with the line of travel of said carrier, means for oscillating said mounting in a plane at an angle to its general line of travel, means for effecting a synchronized movement of said mounting with said conveyer during a portion of its travel, and a lacquering nozzle carried by said mounting and operative to coat said objects with coating material during synchronized movements thereof.

22. In a machine of the class described, the combination of a continuously traveling carrier provided with a series of object-supports, a mounting adapted to move during a portion of its travel substantially in the same general direction as the direction of movement of said carrier, a lacquering head carried by said mounting, means for effecting an angular movement of said mounting in a plane substantially at right angles to the plane of travel of the objects on said carrier during the synchronized movement of said mounting, and automatic means for controlling a supply of coating material admitted to said nozzle.

23. In a machine of the class described, the combination of a continuously traveling carrier provided with a series of object-supports, coating means, means for effecting engagement between said coating means and said carrier whereby the coating means may be caused to travel for a limited distance with said carrier, and means for disengaging said coating means from said carrier at the end of said limited movement.

24. In a machine of the class described, the combination of a continuously traveling endless chain conveyer provided with a series of object-supports, means for coating objects mounted on said conveyer, means adapted to mechanically engage said coating means and cause the same to travel with said conveyer for a limited distance, disengaging means operable at the end of said limited movement, and retracting means for restoring said coating means to its original position.

25. In a machine of the class described, the combination of a continuously traveling endless chain conveyer provided with a series of object-supports, means for coating objects mounted on said conveyer, means adapted to mechanically engage said coating means and cause the same to travel with said conveyer for a limited distance, disengaging means operable at the end of said limited movement, retracting means for restoring said coating means to its original position, and means for supplying coating material to said coating means during said synchronized movement.

26. In a machine of the class described, the combination of a continuously traveling endless chain conveyer provided with a series of object-supports, means for coating objects mounted on said conveyer, means adapted to mechanically engage said coating means and cause the same to travel with said conveyer for a limited distance, disengaging means operable at the end of said limited movement, and means controlled by the movement of said conveyer to supply coating material to said coating means during its synchronized movement with said conveyer.

27. In a machine of the class described, the combination of a continuously traveling endless chain conveyer provided with a series of object-supports, means for coating objects mounted on said conveyer, means adapted to mechanically engage said coating means and cause the same to travel with said conveyer for a limited distance, disengaging means operable at the end of said limited movement, means controlled by the movement of said conveyer to supply coating material to said coating means during its synchronized movement with said conveyer, and means for shutting off said supply during its retractive movement.

28. In a machine of the class described, the combination of a continuously traveling endless chain conveyer provided with a series of object-supports mounted thereon, means for rotating said objects, a coating head adjacent to the line of travel of said objects, mechanical means adapted to engage said head and effect a synchronized movement thereof substantially parallel with the line of travel of said objects on said conveyer and for a limited portion of its travel, means for retracting said coating head operable after said limited movement, means for effecting a relative change in the angular position of said coating head during said synchronized movement, means for admitting coating material to said head during said synchronized movement, and means for closing said supply during the retractive movement of said head.

29. In a machine of the class described, the combination of a moving carrier provided with a series of object-supports, a coating head adapted to apply quick-drying compound to said objects during their travel on said carrier, means adapted to engage and move said coating head with said conveyer, latch mechanism for said engaging means, and release mechanism operable after said coating head has traveled a limited distance with said conveyer.

30. In a machine of the class described, the combination of a moving carrier provided with a series of object-supports, a coating head adapted to apply quick-drying compound to said objects during their travel on said carrier, means adapted to engage and move said coating head with said conveyer, latch mechanism for said engaging means, release mechanism operable after said coating head has traveled a limited distance with said conveyer, and means for shutting off the supply of coating material to said head, operable during the synchronized movement of said coating head and prior to the operation of said release means.

31. In a machine of the class described, the combination of a continuously traveling conveyer provided with a series of object-supports, the combination of a reciprocable coating head, means for effecting a synchronized movement of said coating head for a limited distance with said conveyer, means for admitting coating material to said head operable at the beginning of said synchronized movement, and means for shutting off said supply prior to the finish of said synchronized movement.

32. In a machine of the class described, the combination of a continuously traveling conveyer provided with a series of object-supports, the combination of a reciprocable coating head, means for effecting a synchronized movement of said coating head for a limited distance with said conveyer, means for admitting coating material to said head operable at the beginning of said synchronized movement, means for shutting off said supply prior to the finish of said synchronized movement, and means for effecting change in the position of said coating means during said synchronized movement whereby the entire surface of said objects is coated.

33. In a machine of the class described, the combination of a carrier provided with a series of hollow supporting spindles, chucks on said spindles for holding a series of objects to be polished, coating means and shifter pins contained within said spindles for moving said objects from said chucks into the coating field.

34. In a machine of the class described, the combination of a continuously traveling endless link chain conveyer composed of a series of articulated bearing members, spindles transversely mounted to rotate in said bearing members, pulleys on one end of said spindles, chucks on the other end of said spindles adapted to hold a series of objects thereon, polishing means arranged in the path of travel of said objects in their movement on said conveyer, a belt traveling at a comparatively high speed and adapted to engage the pulleys on said spindles while said objects are in engagement with said polishing means, means for coating said objects after the polishing operation, and subsidiary means for rotating said objects at a comparatively low speed while being coated.

35. In a machine of the class described, the combination of a continuously traveling endless link chain conveyer composed of a series of articulated bearing members, spindles transversely mounted to rotate in said bearing members, pulleys on one end of said spindles, chucks on the other end of said spindles adapted to hold a series of objects thereon, polishing means arranged in the path of travel of said objects in their movement on said conveyer, a belt traveling at a comparatively high speed and adapted to engage the pulleys on said spindles while said objects are in engagement with said polishing means, means for coating said object after the polishing operation, subsidiary means for rotating said objects at a comparatively low speed while being coated, shifter pins contained within said spindles normally inoperative during the polishing operation, and means for effecting an endwise axial outward movement of said pins subsequent to the polishing operation and prior to the coating operation, and operative to remove said objects a substantial distance outwardly from said chucks.

JOHN F. GAIL.

Witnesses:
JOHN J. MANGEL,
JOHN BURNS.